(12) United States Patent
Zhang et al.

(10) Patent No.: US 9,904,522 B2
(45) Date of Patent: Feb. 27, 2018

(54) WEB DEVELOPMENT SYSTEM

(71) Applicants: Jie Zhang, Haidian District Beijing (CN); Xun Shao, Fengtai District Beijing (CN)

(72) Inventors: Jie Zhang, Haidian District Beijing (CN); Xun Shao, Fengtai District Beijing (CN)

( * ) Notice: Subject to any disclaimer, the term of this patent is extended or adjusted under 35 U.S.C. 154(b) by 0 days.

(21) Appl. No.: 15/038,602

(22) PCT Filed: Nov. 24, 2014

(86) PCT No.: PCT/CN2014/092054
§ 371 (c)(1),
(2) Date: May 23, 2016

(87) PCT Pub. No.: WO2015/078343
PCT Pub. Date: Jun. 4, 2015

(65) Prior Publication Data
US 2016/0299745 A1    Oct. 13, 2016

(30) Foreign Application Priority Data
Nov. 27, 2013    (CN) .......................... 2013 1 0616861

(51) Int. Cl.
G06F 9/44        (2006.01)
G06F 17/30      (2006.01)
(Continued)

(52) U.S. Cl.
CPC ................. *G06F 8/31* (2013.01); *G06F 8/30* (2013.01); *G06F 8/65* (2013.01); *G06F 8/67* (2013.01); *G06F 9/45529* (2013.01)

(58) Field of Classification Search
CPC .............. G06F 17/248; G06F 17/3089; G06F 9/45512; G06F 8/34; G06F 8/31;
(Continued)

(56) References Cited

U.S. PATENT DOCUMENTS 7,243,341 B2    7/2007   Murray
7,316,003 B1 *  1/2008   Dulepet ................ G06F 17/218
                                              717/110
(Continued)

FOREIGN PATENT DOCUMENTS

CN    101034349 A    9/2007
CN    101477461 A    7/2009
(Continued)

OTHER PUBLICATIONS

Lebresne et al., Understanding the dynamics of JavaScript, Jul. 2009, 4 pages.*

(Continued)

*Primary Examiner* — Thuy Dao
(74) *Attorney, Agent, or Firm* — Innovation Capital Law Group, LLP; Vic Lin

(57) ABSTRACT

The present invention provides a web development system. In a running state of a web application being developed, the development system generates or modifies a script code used to perform a predetermined function. The development system includes a script parser that parses the generated script code or the modified script code to correspondingly generate an object type which performs a new function, or to modify the object type which performs an existing function. The development system also includes an object manager that generates a new function object or modifies the existing function object according to the generated object type and organizes the invoking relationships between the new or modified function object and other objects, so as to generate or modify the predetermined function when the web application is operating.

19 Claims, 13 Drawing Sheets

(51) Int. Cl.
*G06F 3/048* (2013.01)
*G06F 3/00* (2006.01)
*G06F 9/455* (2018.01)
*G06F 9/445* (2018.01)

(58) Field of Classification Search
CPC .... G06F 8/65; G06F 11/3664; G06F 11/3684; G06F 8/30; G06F 8/67; G06F 8/71; G06F 9/45529; H04L 69/329; G06Q 30/0641; G06Q 10/06; G06Q 10/10
See application file for complete search history.

(56) References Cited

U.S. PATENT DOCUMENTS

| | | | | |
|---|---|---|---|---|
| 7,934,158 | B2* | 4/2011 | McLean | G06F 9/45512 704/207 |
| 8,108,829 | B2* | 1/2012 | Cypher | G06F 8/34 717/106 |
| 8,893,081 | B2 | 11/2014 | Payzer et al. | |
| 8,943,519 | B2* | 1/2015 | Chang | G06F 9/45512 703/2 |
| 8,966,441 | B2* | 2/2015 | Cohanoff | G06F 8/30 717/115 |
| 9,141,346 | B2* | 9/2015 | Quine | G06F 8/34 |
| 9,244,707 | B2* | 1/2016 | Zhang | G06F 9/45512 |
| 2003/0200349 | A1 | 10/2003 | Hansen | |
| 2008/0046557 | A1* | 2/2008 | Cheng | H04M 1/72525 709/224 |
| 2012/0291005 | A1* | 11/2012 | Quine | G06F 9/45529 717/105 |
| 2012/0291011 | A1* | 11/2012 | Quine | G06F 9/45512 717/115 |
| 2013/0151417 | A1* | 6/2013 | Gupta | G06Q 20/382 705/65 |
| 2013/0191880 | A1 | 7/2013 | Conlan et al. | |
| 2014/0047413 | A1* | 2/2014 | Sheive | H04L 65/403 717/110 |

FOREIGN PATENT DOCUMENTS

| | | |
|---|---|---|
| CN | 102271121 A | 12/2011 |
| CN | 102591643 A | 7/2012 |
| CN | 102810210 A | 12/2012 |
| CN | 102843393 A | 12/2012 |
| CN | 102902537 A | 1/2013 |
| CN | 103020310 A | 4/2013 |
| CN | 103135976 A | 6/2013 |
| CN | 103309806 A | 9/2013 |
| CN | 103617037 A | 3/2014 |

OTHER PUBLICATIONS

Maleki et al., Liveness, localization and lookahead: interaction elements for parametric design, Jun. 2014, 10 pages.*
First Office Action dated Mar. 23, 2016 in China App. No. 201310616861.8.
Li Jiang. Thesis entitled "Design and Implementation of Web Application Development Framework Based on MDA". Publication Date/Issue Date: Mar. 15, 2012.
Second Office Action in China Application No. 201310616861.8 dated Aug. 18, 2016.
4th Office Action dated Jun. 2, 2017 from corresponding China Application No. 201310616861.8

* cited by examiner

Fig. 9

WEB DEVELOPMENT SYSTEM

CROSS-REFERENCE TO RELATED APPLICATION

This application is the U.S. national phase of PCT Application No. PCT/CN2014/092054 filed on Nov. 24, 2014, which claims priority to CN Patent Application No. 201310616861.8 filed on Nov. 27, 2013, the disclosures of which are incorporated in their entirety by reference herein.

TECHNICAL FIELD

The present invention relates to the field of web application development, and in particular to a development method for a web development system and a web development system.

BACKGROUND ART

Web systems for developing web applications are widely used at present. Web applications (webapp in short) are application software for accessing the web and performing operations on the internet or the intranet by using a web browser, and are application software written in web programming languages such as HTML, JavaScript, Java, etc. The web system is based on a client-server mode, wherein, a web client is a browser on the client's end, and a web server is a host machine for storing resources.

Currently, the development of the web system mainly comprises a developing phase and an operating phase. In the developing phase, developers use IDE (Integrated Development Environment) development tools to perform the following operations: editing, compiling, deploying, and running. Specifically, developers use various IDE development tools to edit function code locally. After the function code is developed, the IDE development tools are used to compile the function code locally. Then the compiled program packages are deployed to a server for running and debug. The start and the termination of the server must be manually operated by developers. After the development and the testing of the function code is completed, the function code is sent to the terminal users for use, entering into the operating phase.

Due to technical constraints, developers can not view a developed function page in a WYSIWYG (What You See Is What You Get) fashion. That is, when the function code is completed, developers can not view the corresponding function page in a web browser until the function code is compiled, deployed and run. In addition, when a function page is up and running, if the function page needs to be modified, developers must return to the code editing step to edit or modify the code by using the IDE development tools. After the modified code is compiled, deployed to the server again and restarted, the effect of the modified code can be viewed in running function page, which affects the efficiency of developers in code developing.

Meanwhile, for developers who are not familiar with the application program already developed or with the web system, a significant amount of time should be consumed in understanding the logic in the code so as to continue with the development work. This demands significant learning cost, which is depended on the complexity of the developed applications of the web system.

SUMMARY OF THE INVENTION

To address the above problems, the inventor proposes a new development method for a web development system and a web development system. The development method for the web development system and the web development system enables development duly in a system running state, with no need for code to be written, compiled locally, to be deployed to a server, and for the developer to manually start the server to run the code. The code can be duly loaded to the server for running.

According to one aspect of the present invention, a development method for a web development system is provided, which comprises the following steps: in the running state of the web development system, generating or modifying script code used to perform a predetermined function; parsing, by a script parser, the generated script code or the modified script code to correspondingly generate an object type which performs a new function, or to modify the object type which performs an existing function; and generating a new function object or modifying the existing function object by an object manager, according to the generated object type which performs the new function or the modified object type which performs the existing function, and organizing invoking relationships between the new function object and other objects, or invoking relationships between the modified function object and other objects, so as to generate or modify the predetermined function when the web development system is operating.

Preferably, in the development method for the web development system, the step of generating or modifying script code used to perform a predetermined function comprises: invoking a template corresponding to the predetermined function in a function template library with input parameter (s), wherein the function template library comprises at least one script template corresponding to a function; and generating the script code corresponding to the predetermined function.

Preferably, in the development method for the web development system, the step of generating or modifying script code used to perform a predetermined function comprises: invoking automatically the script code to be modified corresponding to the existing function for modification.

Preferably, in the development method for the web development system, the step of generating or modifying script code used to perform a predetermined function comprises: designing a presentation effect of a function in a visual manner, so as to modify or generate automatically the script code corresponding to the presentation effect of the function.

According to another aspect of the present invention, a web development system is provided, which comprises: a device for script generation and modification, adapted to, in the running state of the web development system, generate or modify script code used to perform a predetermined function; a script parser, adapted to parse the generated script code or the modified script code to correspondingly generate an object type which performs a new function, or, modify the object type which performs an existing function; and an object manager, adapted to generate a new function object or modify the existing function object according to the generated object type which performs the new function or the modified object type which performs the existing function, and to organize invoking relationships between the new function object and other objects, or invoking relationships between the modified function object and other objects, so as to generate or to modify the predetermined function when the web development system is operating.

Preferably, in the web development system, the device for script generation and modification comprises: a function template library which comprises at least one script template corresponding to a function; and a code generator, adapted to invoke a template corresponding to the predetermined function in the function template library with input parameter(s), and generate the script code corresponding to the predetermined function.

Preferably, in the web development system, the device for script generation and modification comprises: a code editor, adapted to invoke automatically the script code to be modified corresponding to the existing function for modification.

Preferably, in the web development system, the device for script generation and modification comprises: a page designer, adapted to design a presentation effect of a function in a visual manner, so as to modify or generate automatically the script code corresponding to the presentation effect of the function.

Preferably, in the web development system, the object manager is connected with the code generator, and/or the code editor, and/or the page designer, so as to generate relationship(s) among objects by using the code generated or edited by the code generator, and/or the code editor, and/or the page designer.

According to the development method for the web development system and the web development system in the present invention, in the developing phase, developers can create new function objects dynamically into the system memory or update an existing function object through framework running script code in a WYSIWYG manner or a template manner under a running state of the web development system, so as to rapidly generate functions to develop system functions in a running state in the WYSIWYG manner. Furthermore, the web development system can link to the code corresponding to the developed functions rapidly, thus developers can understand the original system and modify the original functions conveniently. The development method and the web development system can transfer the code development to the web client, so that developers can perform remote development without being exposed to and understanding the development environment, thereby improving the security of the development.

Additionally, every function module developed by the web development system can be componentized, so every function module can be invoked readily by other function modules. Thus the code of every function module can be reused in a high degree, which greatly improves the efficiency of the development. Furthermore, the system can be upgraded by directly loading the new function code with no need of a shutdown of the system, which reduces the workload greatly and improves the working efficiency.

In conclusion, the development method for the web development system and the web development system in the present invention can change the current development manner, improve development efficiency, and increase the productivity of the software production enterprises.

BRIEF DESCRIPTION OF THE DRAWINGS

FIG. 9 is a schematic diagram illustrating an example of a code editing page which includes a code editor in a running state of the web development system according to the second embodiment according to the present invention;

DETAILED DESCRIPTION OF THE EMBODIMENTS

Figure 1:
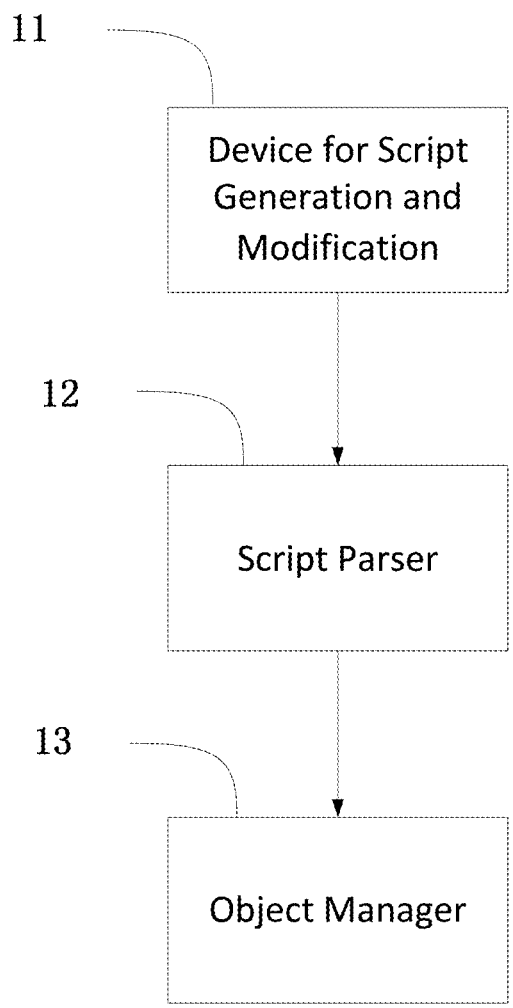
FIG. 1 is a block diagram illustrating the working principles of a web development system according to the present invention.

The preferred embodiments will be described in detail according to the accompanying drawings. It should be noticed that the relative arrangement of the components and the shape of the devices in the embodiments are merely examples, and are not meant to limit the protect scope of the present invention. Furthermore, like references and words in the drawings refer to like items, thus if an item is defined in a drawing, it need not be discussed in the following drawings.

The web development system according to the present invention enables development duly in a system running state, during which web development can be integrated with the web application to complete the development of an application system in its running state, the code can be run without being compiled and deployed, thereby improving the user experience of developers and the efficiency of the developing work. Editing and modifying code in the running state of the web development system are achieved in the present invention. Specifically, in order to achieve the above aims, a web development system as illustrated in FIG. 1 is adopted in the present invention. FIG. 1 is a block diagram illustrating the working principles of a web development system according to the present invention.

The web development system comprises a device for script generation and modification 11, a script parser 12 and an object manager 13.

1. Device for Script Generation and Modification 11 and Script Parser 12

In the prior art, developers edit Java application code in Java language, compile the code after the editing, deploy the code to a server, and then operate the server to run the web application system with specific predetermined functions. When the functions need to be modified, it is necessary for developers to reedit, recompile and deploy the code to a server, and then restart the server to run the web application system with the modified functions. According to the present invention, a device for script generation and modification and a script parser are used, wherein the device for script generation and modification 11 performs editing and modification on the script code for a predetermined function, and the script parser 12 parses the script code to generate an object type which performs a new function or modify the object type which performs an existing function.

The use of the script code and the script parser enables code to be edited and modified in a running state of the web system, and a new function or a modified function can be accomplished by merely loading the code, which thereby ridding of the constraints of traditional methods and making the development and modification of web applications more convenient and easy.

Specifically, the script code is, for example, the code conforming to the groovy script syntax standard, and the script parser 12 is, for example, a groovy script parser. Naturally, a person skilled in the art should understand that the script code can be any other script code which can be used in a web development system, and the script parser 12 can be any other script parser which can generate function object types by parsing the script code.

2. Object Manager 13

An object manager 13 generates an object according to the generated function object type, and it stores and manages function objects. Furthermore, the object manager assigns a unique identification ID for each function object and sets relationships between function objects. The relationships can be construed as, when a function object is clicked, another function object is invoked. The object manager 13 can be designed with the spring open source technology or other technologies which can manage and set function objects.

Figure 2:
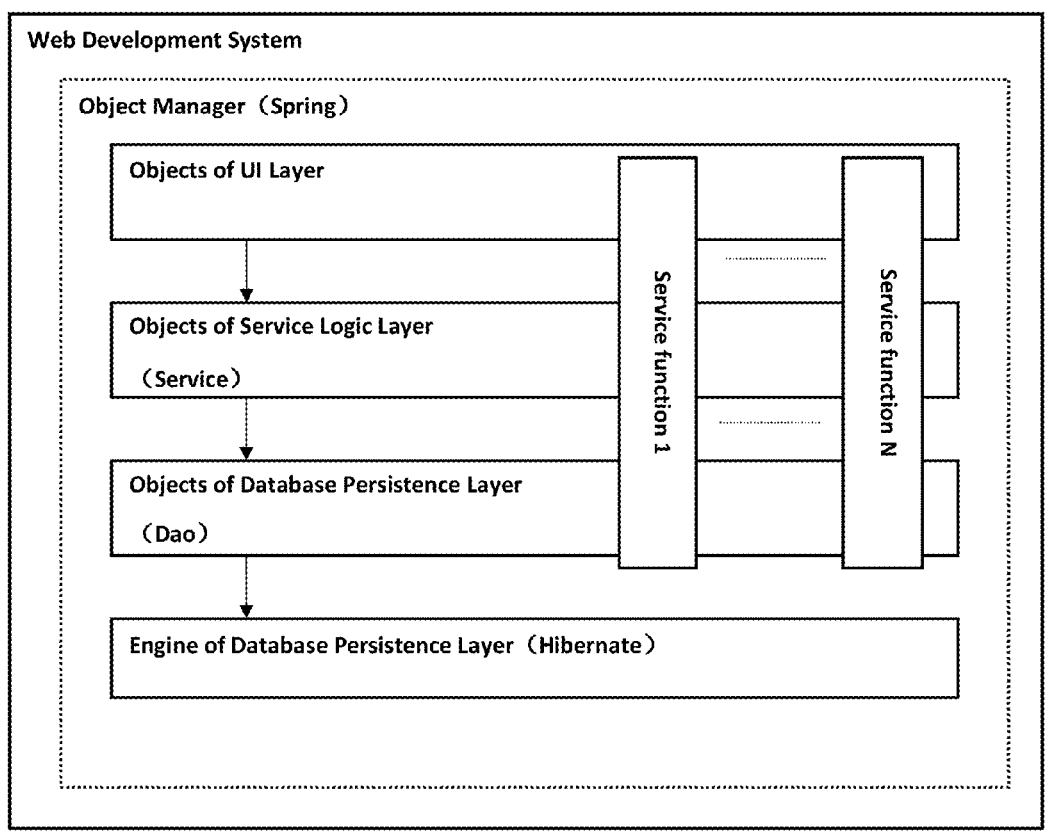
FIG. 2 is a schematic diagram illustrating the structure of the system level of a web development system according to the present invention.

FIG. 2 is a schematic diagram illustrating the structure of the system level of a web development system according to the present invention.

As shown in FIG. 2, in the web development system, an object manager manages the objects generated from the code. Furthermore, the code object corresponds to the script code generated and/or modified by the code generator, the code editor and the page designer.

In particular, the code object comprises a user interface layer (UI layer in short) object, a service logic layer (service layer in short) object and a database persistence layer (dao layer in short) object.

Wherein, the UI layer object is an object corresponding to a visual page presented to the user eventually. For example, formats and layouts of a form, the font and the color of each field in a page presented to the user, and the other attributes related with the presented page.

The service logic layer object is an object relevant to processing of the performed services. The service functions comprise adding, deleting, modifying and searching of data with respect to a certain service table in the database. After a user inputs service data in a newly added page and submits said data to the system, the system will invoke corresponding objects and functions in the service logic layer to store the data submitted by the user to a corresponding table(s) in the database.

The database persistence layer object accesses the database and stores data therein. In the web development system, accessing and storing with respect to the database are performed in the form of an object by a database accessor (not shown in the figure), thereby accessing the contents in the database with an inquiring object.

The database persistence layer object accesses a database persistence layer engine such as Hibernate. Wherein, the database persistence layer engine performs mapping and binding on the tables in the database with the value objects in the program. After the binding, developers can modify the data in the mapped tables merely by adding, deleting, modifying and searching the data in the value objects, with no need to access the data in the database with manually written SQL clauses. This, on the one hand, simplifies the code for accessing the database, and on the other hand, masks the difference and the change between various databases. Since various databases assume different SQL syntax, the system can support various databases readily.

Hereinafter, the working principles of the web development system according to the present invention will be described in conjunction with FIG. 3. Wherein, FIG. 3 is a flow chart illustrating the working principles of a web development system according to the present invention.

Figure 3:
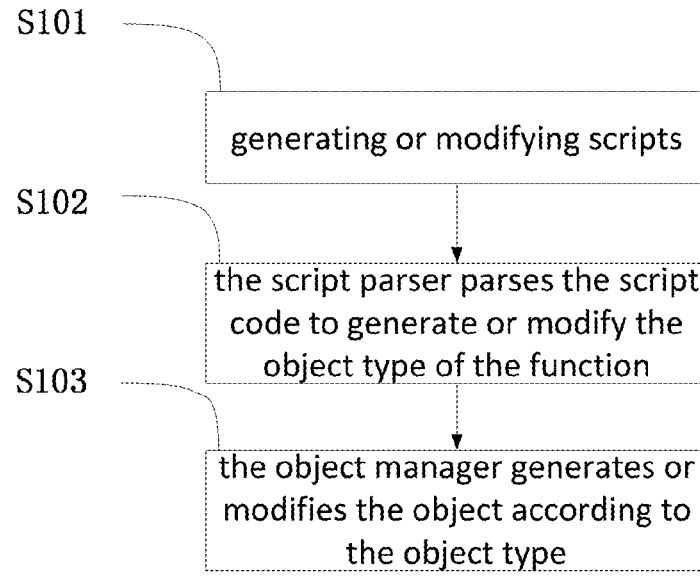
FIG. 3 is a flow chart illustrating the working principles of a web development system according to the present invention.

As shown in FIG. 3, in step S101, developers generate or modify script code used to perform a predetermined function in a running state of the web development system. In step S102, the script parser 12 parses the generated script code or the modified script code to correspondingly generate an object type which performs a new function, or modify the object type which performs an existing function. In step S103, the object manager generates an object according to the object type, and manages the relationships between the generated object and other objects, thereby generating or modifying the functions of the system in a running state of the web development system can be achieved.

Alternatively, vaadin technology is proposed in the solution according to the present invention. Vaadin technology is a rendering engine of a system UI, which comprises a set of UI component library and functions for rendering UI interfaces. Developers develop interfaces by invoking the API of UI components. With the vaadin technology, there is no need for developers to not only edit the frontend page code for the clients, but also to edit the server end code. Instead, developers only need to invoke vaadin in the server end code to obtain the function interfaces. With the vaadin technology, the code for the frontend client and the code for the backend server can be combined, thereby simplifying the function code, enabling the unified invoking and the unified loading of the code of pages and service processing, and making possible modifying functions in a system running state. Undoubtedly, a person skilled in the art should appreciate that any technologies which can combine the code for the frontend client and the code for the backend server can be used in the present invention.

The web development system provided by the present invention can transfer the development environment of web application from a local setting of developers to the server side. Developers can perform development without in-depth understanding of the development environment, thereby increasing the convenience of the system development. Additionally, through changing the current local web application development to remote web development, the requirement in the performance of local hardware is greatly reduced for developers. As long as the client host hardware of developers can access the web system of the development environment, the development can be performed in a mobile device (such as a flat panel or a mobile phone).

Furthermore, developers need not upgrade the features of the hardware of the development environment in accordance with the development system, thereby reducing the cost of the hardware for developers.

Hereinafter, the generation and the modification of the system functions in a running state of the web system will be described in detail respectively.

Figure 4:
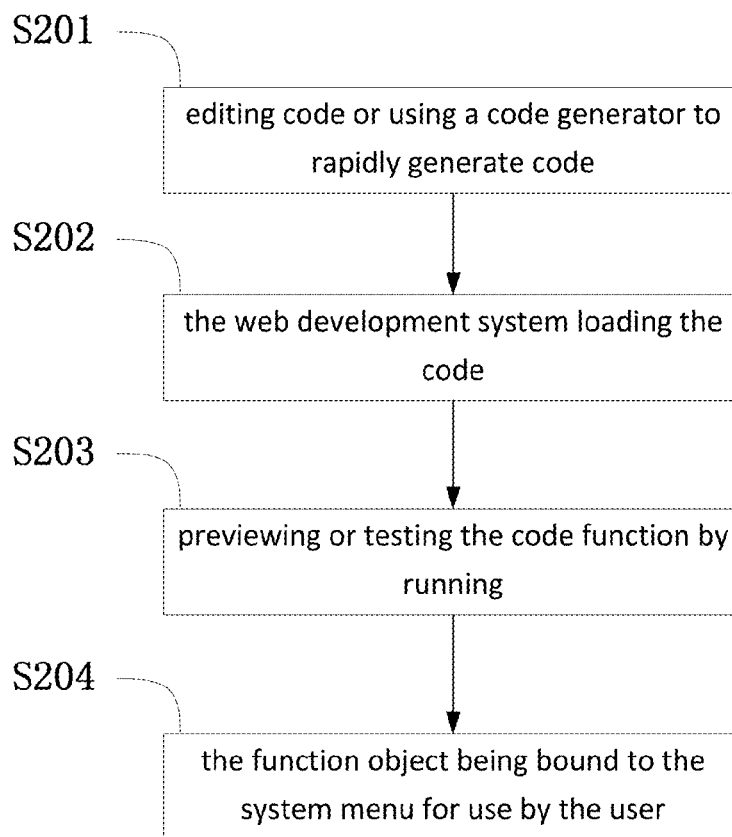
FIG. 4 is a flow chart illustrating code generation of a web development system according to the present invention.

FIG. 4 is a flow chart illustrating code generation of a web development system according to the present invention.

Figure 5:
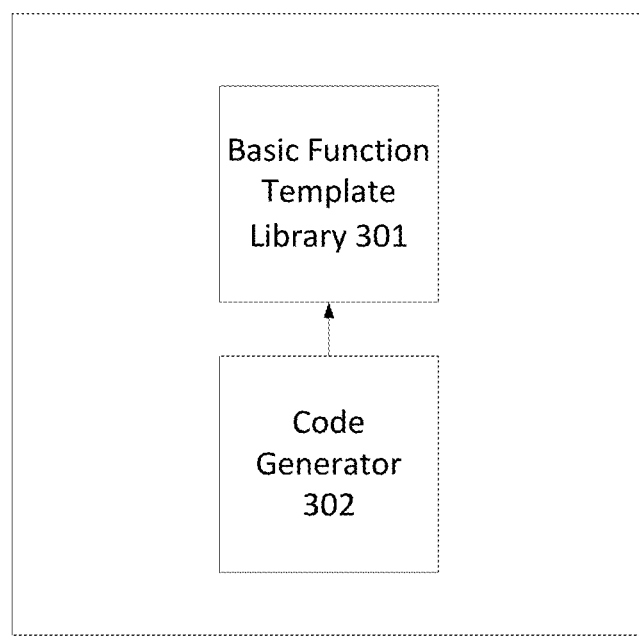
FIG. 5 is a block diagram illustrating a device for script generation and modification of a web development system according to a first embodiment according to the present invention.

As shown in FIG. 4, in step S201, developers edit code manually, or use a code generator (as shown in FIG. 5, to be described in detail in the following description) to rapidly generate code for a predetermined function. The code edited by developers manually conforms to a script syntax standard. In step S202, the web development system loads the code to generate a corresponding function object. In step S203, the web development system performs previewing and testing by running the function object, so as to the effect of the web system in the real running time can be seen. In step S204, the function object is bound to the system menu for use by the user. Through the above process, code generation in a running state of the web system is done.

The process of rapid code generation by using a code generator will be described in detail hereinafter. FIG. 5 is a block diagram illustrating a device for script generation and modification of a web development system according to a first embodiment according to the present invention. As shown in FIG. 5, a device for script generation and modification according to the first embodiment according to the present invention comprises a basic function template library 301 and a code generator 302.

The basic function template library 301 comprises code templates corresponding to basic functions. A person skilled in the art should understand that the basic functions are for performing services. Fox example, for the database, the basic functions can be, for example, adding, deleting, modifying and searching the contents of the database.

The code generator 302 enables rapid generate code for predetermined functions in a system running state by the developer. When the developer enters parameters into the code generator 302, such as a SQL query, the system will parse the parameters to obtain a name of the main table and names of fields to be queried automatically, which are initialized in a setting page of the code generator. The parameters comprise the table name for query by the search function, the fields for query in the query list, the table name and fields to be added by the adding function, the table name and fields to be modified by the modifying function, the table name to be deleted by the deleting function and deleting condition fields. Based on that, the developer can further modify the parameters and save the completed modification, and then the template engine will generate script code according to the corresponding template and parameters. The code generator 302 loads the parameters to the basic function template library 301, and generates the desired code eventually. That is, the code generator 302 provides an interface to allow developers inputting parameters to automatically invoke the basic function template library 301 to generate corresponding code for the function pages. Through using the existing templates to generate code for predetermined functions, the quality of the generated code can be guaranteed, and the discrepancy of the quality of the generated code resulted from the code writing style and the level of developers can be avoided. As an embodying mode, the code generator 302 can load the parameters to the basic function template library 301 to generate code with the freemarker open source technology. The code generator 302 is pre-created and deployed to the server to directly run in the server. Thus, developers can directly use the code generator 302 in their development work.

Hereinafter, an example of development processes in a running state of the web development system according to the first embodiment will be described in conjunction with the interfaces of the web development system in a running state according to the present invention. FIGS. 6A-6D are schematic diagrams illustrating examples of the development processes in a running state of the web development system according to the first embodiment according to the present invention.

Figure 6A:
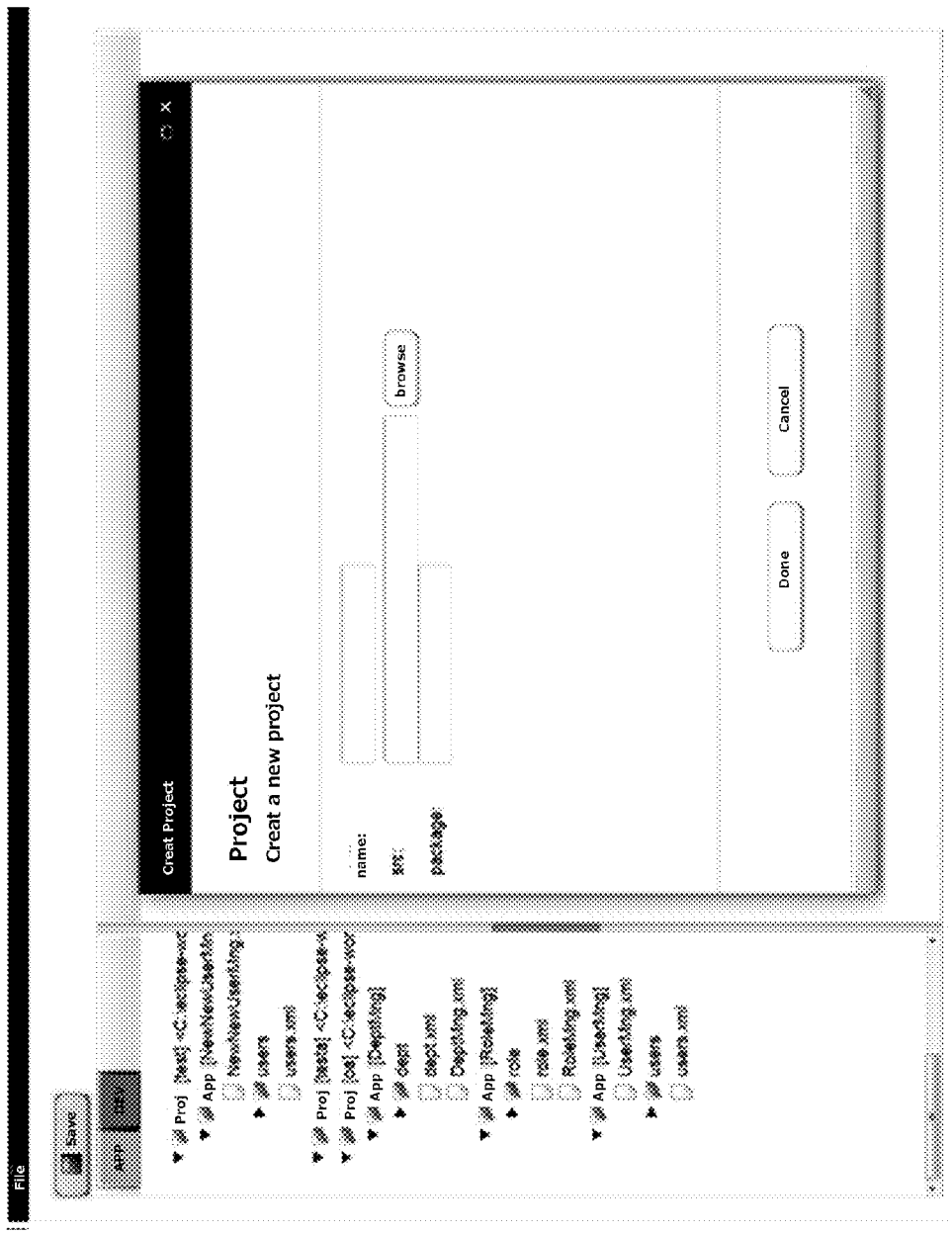
FIGS. 6A-6D are schematic diagrams illustrating examples of the development processes in a running state of the web development system according to the first embodiment according to the present invention.

FIG. 6A illustrates an interface for creating a new project. To the left of the interface in FIG. 6A a function navigation menu is shown. Developers can select creating a project in the function navigation menu, and then input the name of the new project and etc. in the dialog box of the interface as parameters, so as to invoke the template corresponding to the new project from the template library, and to populate the parameters in the template to generate script code.

Figure 6B:
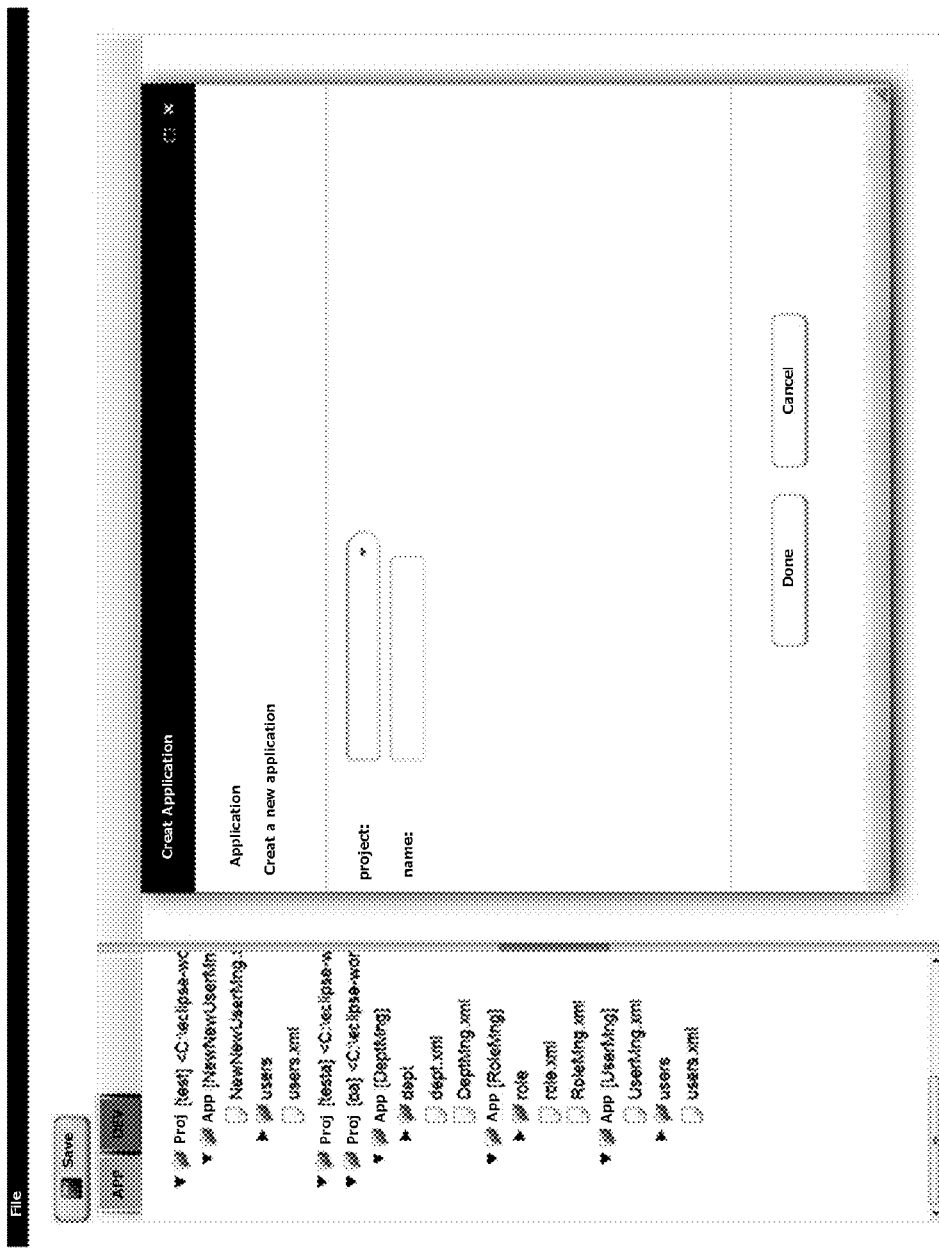

FIG. 6B illustrates an interface of creating a new application. A project may comprise the code for multiple applications, the combination of which constitute a project with certain functions. As shown in FIG. 6B, in the interface of the new application, developers can input the project to which the application belongs and the name of the application and etc. to create the application, and then invoke the corresponding template in the template library to generate the script code.

Figure 6C:
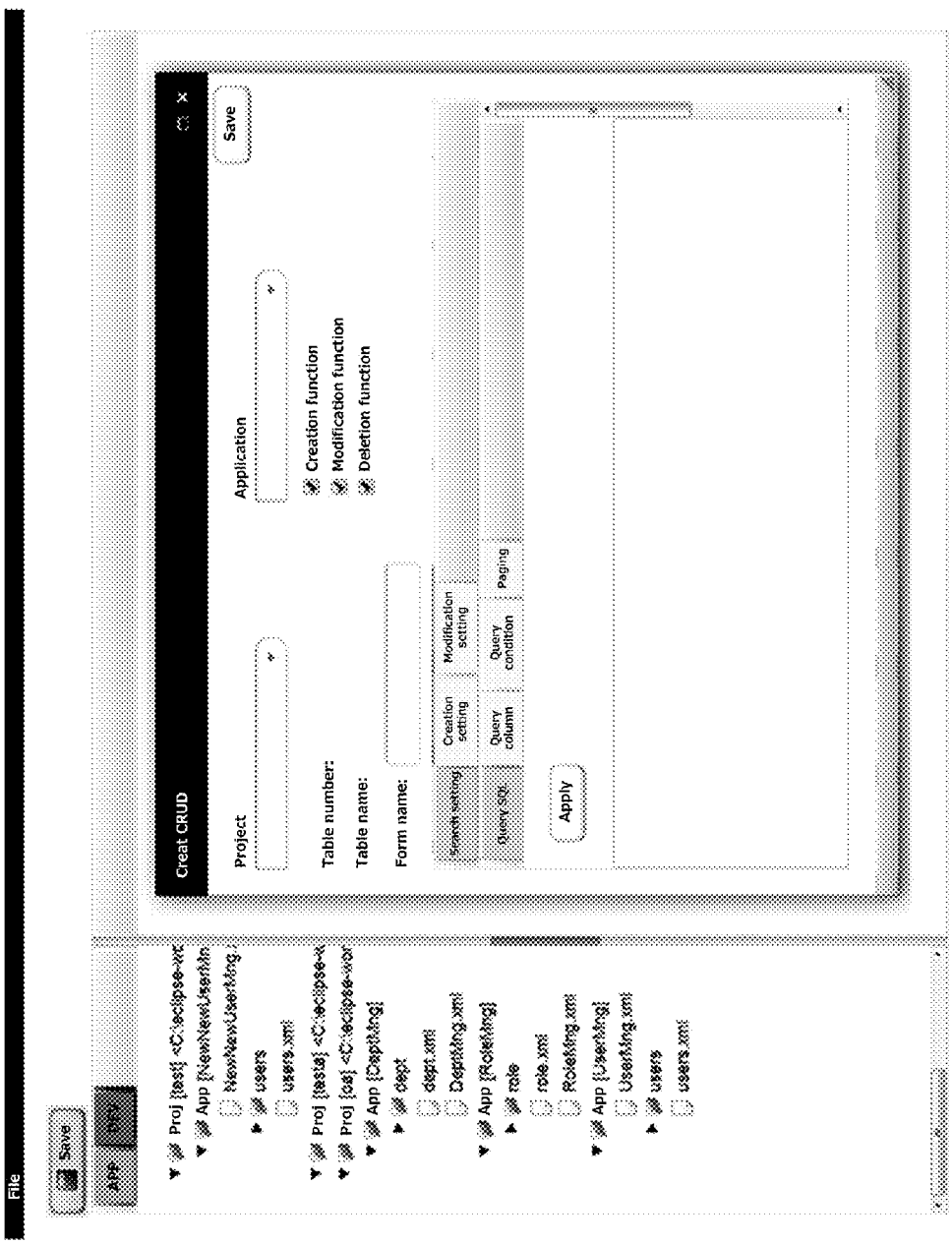

FIG. 6C illustrates an interface for code generation. In the interface of code generation, developers can input or select a project and an application, and select the function to be implemented which corresponds to the project and the application, for example, the "creating function", the "modifying function", the "search function", and the "deleting function". Then, the corresponding templates in the template library will be invoked to generate the script code.

Figure 6D:
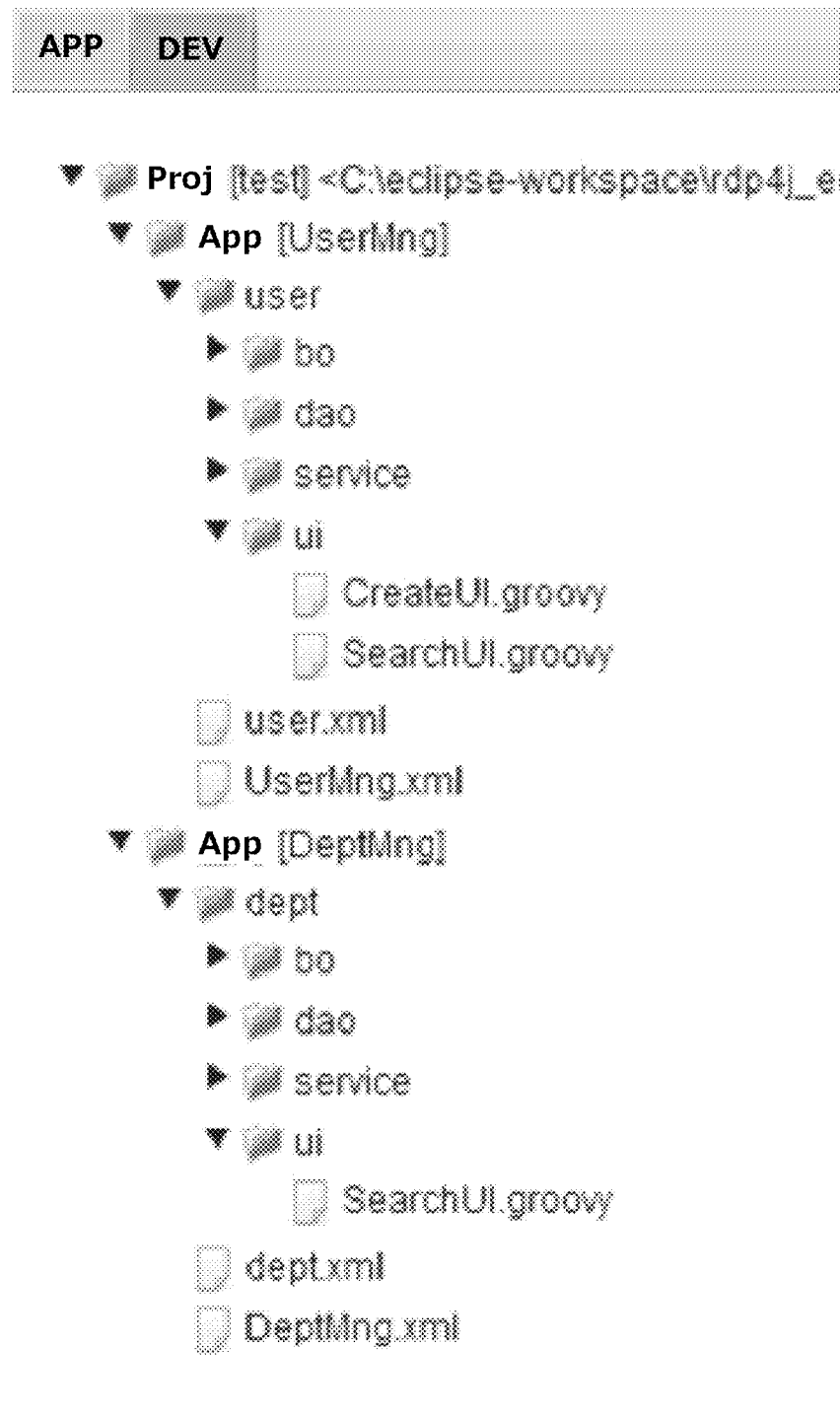

FIG. 6D shows the code generated with the operations from FIG. 6A to FIG. 6C. As shown in FIG. 6D, the script code comprises the project "test" created with the operations of FIG. 6A. Wherein, the project "test" comprises two applications created with the operations of FIG. 6B, that is, "UserMng" and "DeptMng". Furthermore, each project comprises the script "CreateUI.groovy" for the creating function and/or the script "SearchUI.groovy" for the search function.

FIGS. 6A-6D illustrate script code is generated by using the template library and the code generator in an exemplary embodiment. Undoubtedly, a person skilled in the art should understand that FIGS. 6A-6D are only examples, the template library and the code generator can generate script code for all kinds of functions as needed in practice.

With the web development system of the first embodiment according to the present invention, the code can be generated in a running state in the WYSIWYG manner. That is, developers can duly access the server through the web development system, and duly load the code to generate the function pages in a running state in the server. Unlike done in the prior art, where the generation of function pages requires code editing, compiling and deploying in local by the IDE development tool, the web development system improves development efficiency.

Second Embodiment

Figure 7:
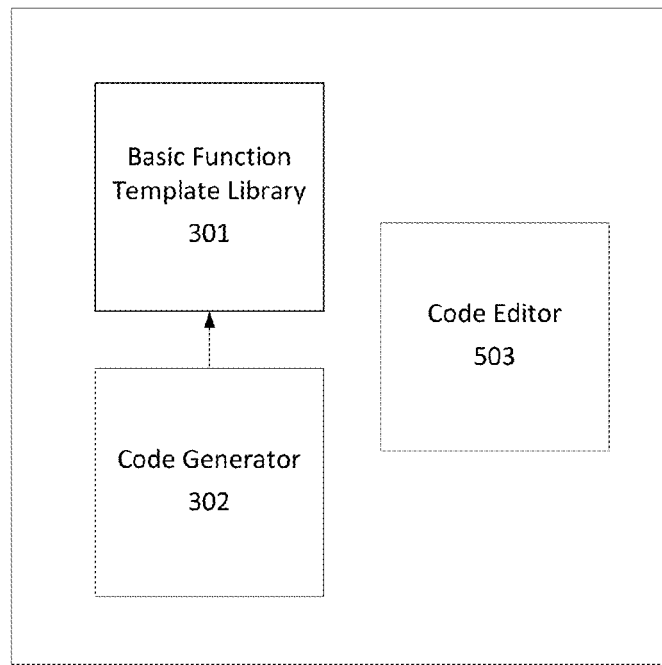
FIG. 7 is a block diagram illustrating a device for script generation and modification of a web development system according to a second embodiment according to the present invention.

FIG. 7 is a block diagram illustrating a device for script generation and modification of a web development system according to a second embodiment according to the present invention. The difference between the device for script generation and modification of the present embodiment and that of the first embodiment is that the device for script generation and modification of the present embodiment further comprises a code editor 503, in addition to the basic function template library 301 and the code generator 302. With the code editor 503, developers can duly display the contents of the script code generated by the code generator or the script code created manually by developers for code editing and modification, and for editing and modifying some configuration files. The original function can be modified by reloading the code after its modification. Like the code generator 302, the code editor 503 is also pre-created and deployed to the server for immediate running in the server. Thus, developers can readily use the code editor 503 in development.

In the web development system of the second embodiment, developers can select a function to be modified and can invoke the code corresponding to the function, so that the code corresponding to the function page to be modified can be shown in the code editor 503 for editing and modification. The code editor 503 can be used to perform editing and modification based on the existing basic functions according to practical requirements, so as to present the function pages for specific properties.

Figure 8:
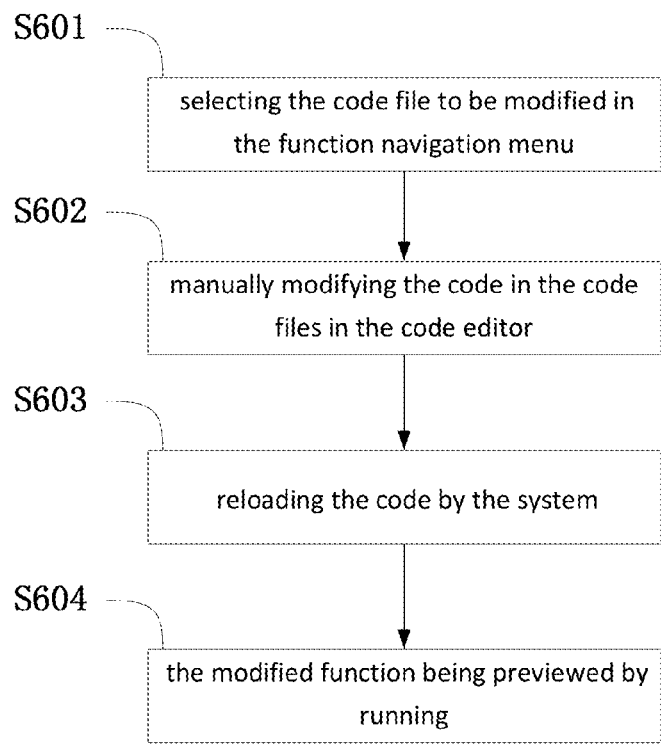
FIG. 8 is a flow chart illustrating modifying functions in a running state of the web development system according to the second embodiment according to the present invention.

FIG. 8 is a flow chart illustrating modifying functions in a running state of the web development system according to the second embodiment according to the present invention. In step S601, developers select the function to be modified in the function navigation menu (as shown in FIG. 6A~FIG. 6D), and then the code editor 503 automatically calls the code files corresponding to the function. In step S602, developers manually modify the code in the code files in the code editor 503. In step S603, the modified code is reloaded to generate a function object. In step S604, the modified function is previewed by running the function object.

Through the code editor 503, the code corresponding to the function can be modified and edited precisely. Besides, the modified code serves to modify the original function of the object when the function is reloaded, with no need for developers, to edit, to compile the code with the IDE development tool locally and to deploy the compiled code to the server for running, as done in conventional web systems.

Figure 9:
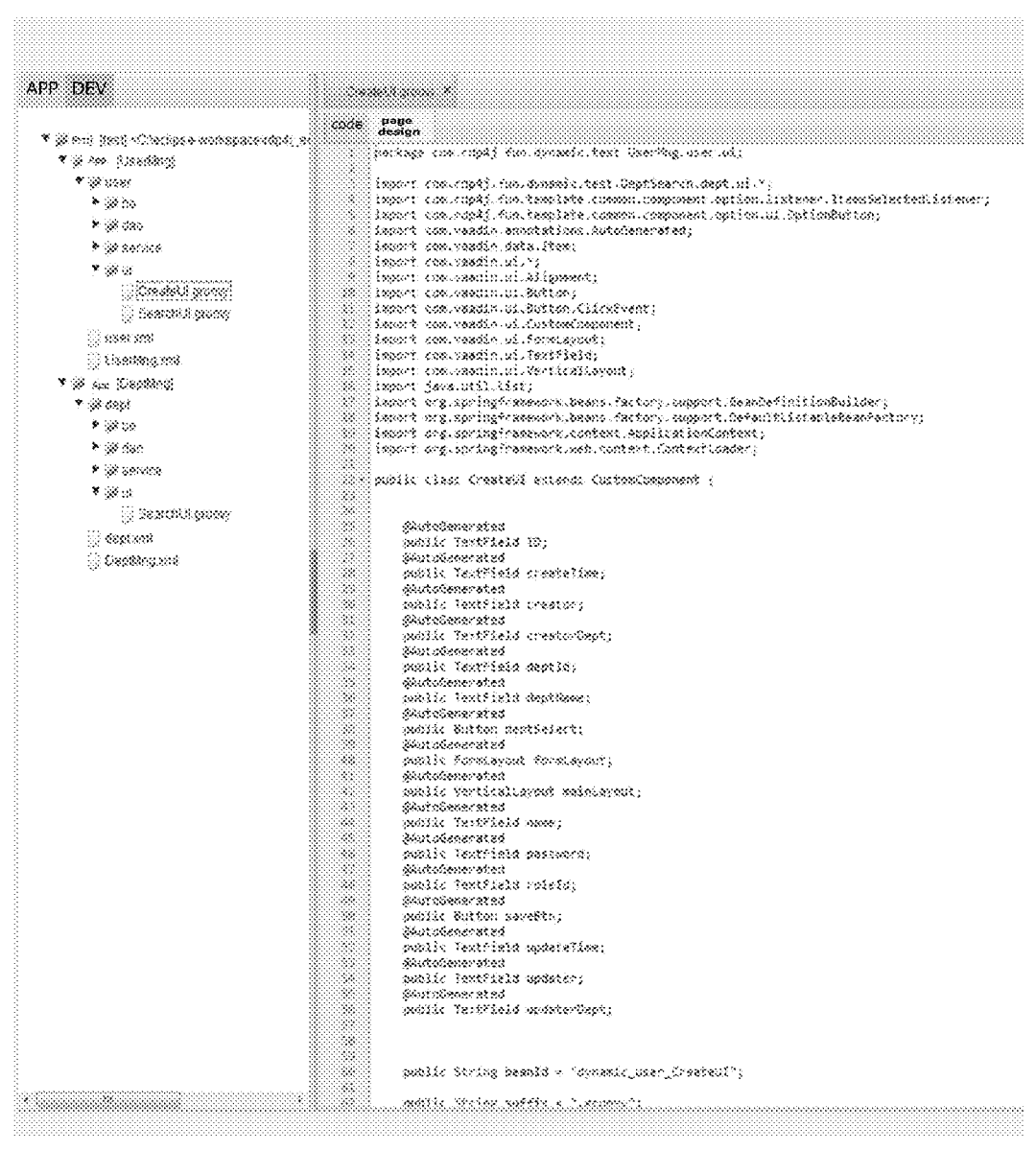

FIG. 9 is a schematic diagram illustrating an example of the code editor 503 in a running state. As shown in FIG. 9, the code in "CreateUI.groovy" are readily displayed for modification in the system.

With the web development system of the second embodiment according to the present invention, code can be edited and modified in the code editor in a running state. Accordingly, the code segments to be edited or to be modified can be located easily for modification in the web development system, with no need for manually searching for the code segments to be modified in the source code, which is time consuming. Furthermore, the modified code can be duly loaded to run, with no need for developers to edit, to compile the code with the IDE development tool locally and to deploy the compiled code to the server for running, as done in conventional web systems.

Third Embodiment

Figure 10:
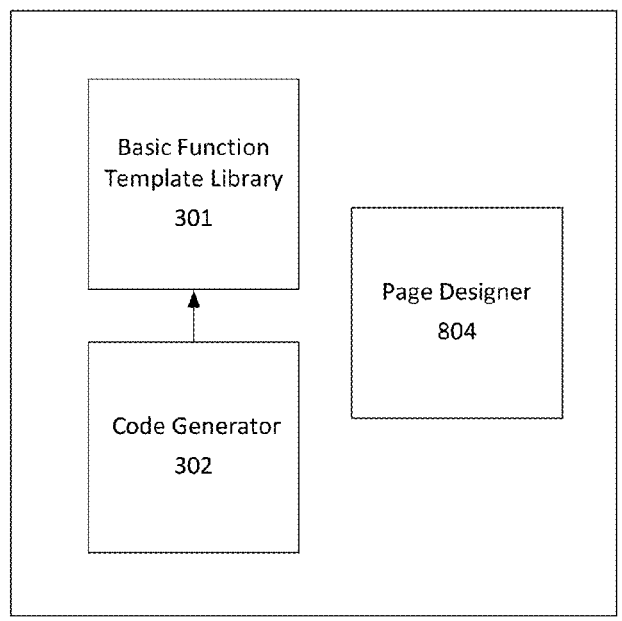
FIG. 10 is a block diagram illustrating a device for script generation and modification of a web development system according to a third embodiment according to the present invention.

FIG. 10 is a block diagram illustrating a device for script generation and modification of a web development system according to a third embodiment according to the present invention. The difference between the device for script generation and modification of the present embodiment and that of the first embodiment is that the device for script generation and modification of the present embodiment further comprises a page designer 804, in addition to the basic function template library 301 and the code generator 302.

In the third embodiment, a page designer 804 serves to design the effect of a function page displayed to users in a visual manner. That is, the page designer 804 serves to visually modify the code of the UI layer. With the page designer 804, developers can add a new component in the original page by visually dragging the component, or change attributes of the original component, such as the position and the color and etc., thereby increasing the efficiency of the page design and the page development. Developers can also define the access rights of each component when using the page designer 804 to design pages, such as feature visible or invisible, enabling use or disabling use. After the access rights of the component are defined, rights for users or roles may be given in the function of the access rights setting. Only authorized users are allowed to view or use corresponding components in corresponding pages.

Figure 11:
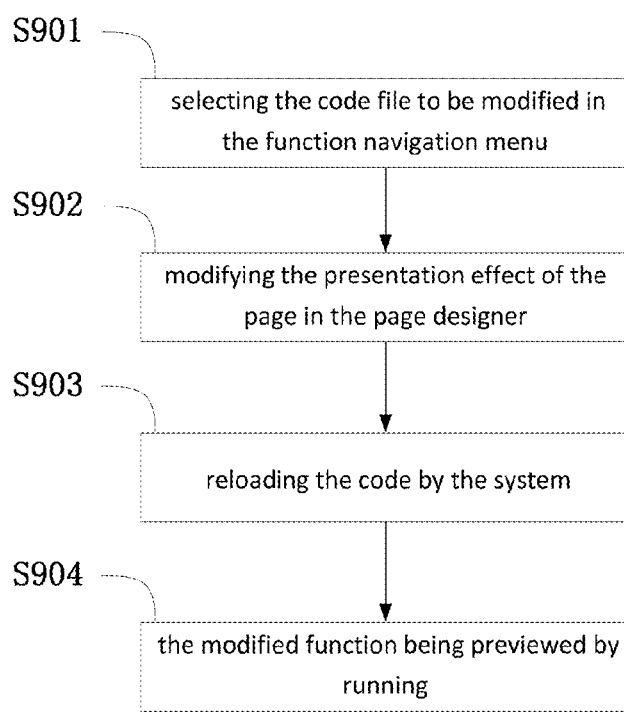
FIG. 11 is a flow chart illustrating a page designer for a page layout in a running state of the web development system according to the third embodiment according to the present invention.
Figure 12:
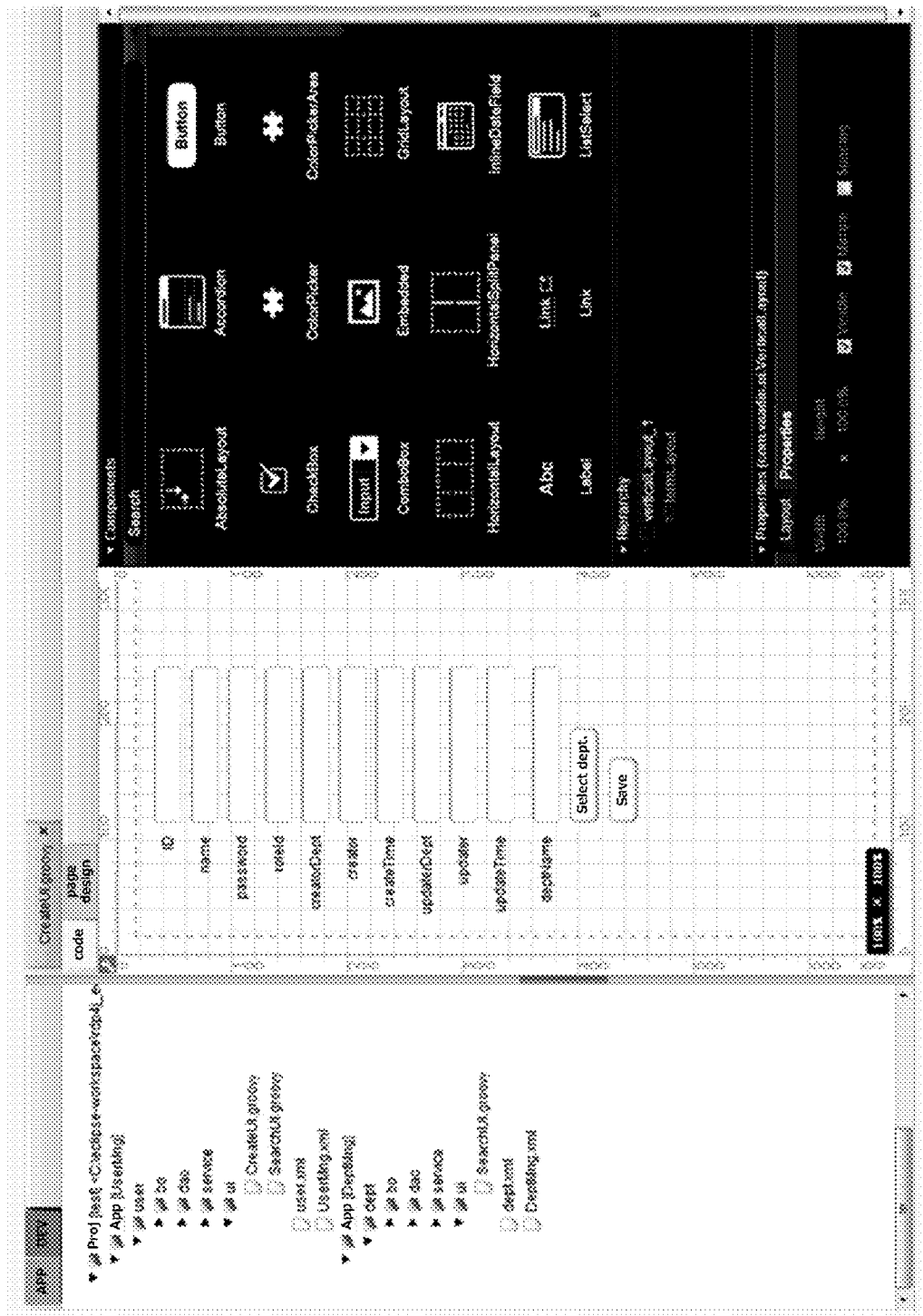
FIG. 12 is a schematic diagram illustrating the page designer for design in a running state of the web development system according to the third embodiment according to the present invention.

FIG. 11 is a flow chart illustrating modifying pages with a page designer in a running state of the web development system according to the third embodiment according to the present invention. In step S901, developers select the function to be modified in the function navigator menu (as shown in FIG. 12), enabling the page designer 804 to display a visual page corresponding to the function automatically. In step S902, developers modify the presentation effect of the page in the page designer 804 by operating a component, such as selecting operation and dragging operation, so as to modify the code and the functions corresponding to the presentation effect of the page. In step S903, the modified code is reloaded to generate a function object. In step S904, the modified function is previewed by running the function object.

FIG. 12 is a schematic diagram illustrating an example of the interface of the page designer 804 according to the third embodiment. As shown in FIG. 12, to the left of the interface an effect of a displayed page is shown, and to its right components that can be added on the page are shown. The width and the height of forms etc. can be set on the left side of the interface. As shown in the right of FIG. 12, the components comprise the color and the layout of the page etc. Developers can modify the presentation effect of the page by selecting the components.

Through the web development system of the third embodiment according to the present invention, presentation attributes of the page can be modified in a visual manner in a running state, and accordingly the code corresponding to the UI layer can be visually modified in the web development system, with no need for manually searching for the code segments to be modified of the UI layer in the source code, which is time consuming. Furthermore, the modified code can be duly loaded to run, without developers, as in the regular web system, edit the code locally by using the IDE development tool and compile the code and compile the code to the server to run.

Fourth Embodiment

Figure 13:
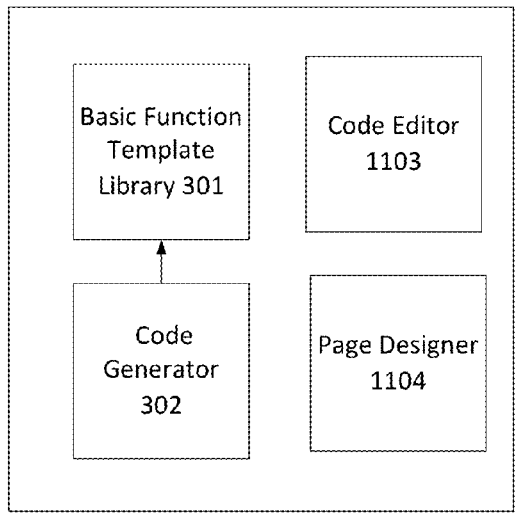
FIG. 13 is a block diagram illustrating a device for script generation and modification of a web development system according to a fourth embodiment according to the present invention.

FIG. 13 is a block diagram illustrating a device for script generation and modification of a web development system according to a fourth embodiment according to the present invention.

The difference between the device for script generation and modification in FIG. 13 and that in FIG. 5 is an addition of a code editor 1103 and a page designer 1104. The code editor 1103 is identical with the code editor 503 in FIG. 7. The page designer 1104 is identical with the page designer 804 in FIG. 10. The descriptions on the code editor 1103 and the page designer 1104 are the same as the descriptions on the code editor 503 and the page designer 804 hereinabove, therefore the description thereof will be omitted herein.

Figure 14:
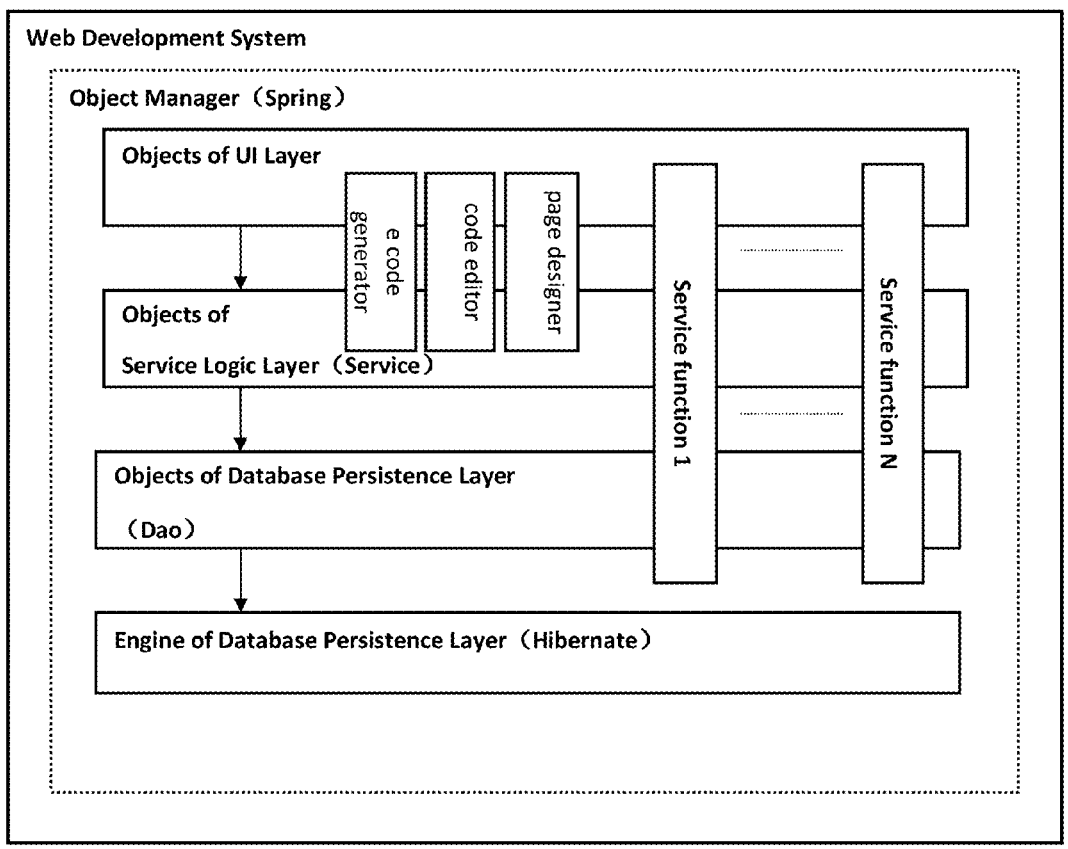
FIG. 14 is a schematic diagram illustrating the system structure of the web development system of the fourth embodiment according to the present invention.

FIG. 14 is a schematic diagram illustrating the structure of the system level of the web development system of the fourth embodiment according to the present invention. In the structure of the system level of the fourth embodiment in FIG. 14, the relationships between the code generator, the code editor, the page designer and code objects of respective layers are described in detail. It can be seen from FIG. 14, the code generator, the code editor and the page designer generate and modify the code corresponding to the object of the UI layer and the object of the service logic layer.

A more common situation is that, the page designer generates and modifies the code corresponding to the objects of the UI layer, while the code generator and the code editor generate and modify the code corresponding to the objects of the UI layer, the objects of the service logic layer and the objects of the database persistence layer.

Although the relationships between the code generator, the code editor, the page designer and code objects in respective layers are described in the fourth embodiment, a person skilled in the art should understand that the relationships also can be applied to the first embodiment through the third embodiment. Fox example, in the first embodiment, the code generator generates and modifies the code corresponding to the objects of the UI layer, the objects of the service logic layer and the objects of the database persistence layer. In the second embodiment, the code generator and the code editor generate and modify the code corresponding to the objects of the UI layer, the objects of the service logic layer and the objects of the database persistence layer. In the third embodiment, the code generator and the page designer generate and modify the code corresponding to the objects of the UI layer, the objects of the service logic layer and the objects of the database persistence layer.

Through the web development system of the fourth embodiment according to the present invention, code can be edited and modified with the code editor in a running state. Accordingly the code segments to be edited or to be modified can be positioned easily for modification in the web development system, the presentation effect of the page can also be modified in a visual manner in a running state, so as to visually modify the code corresponding to the UI layer in the web development system, with no need for manually searching for the code segments to be modified in the source code, which is time consuming. Furthermore, the modified code can be duly loaded to run. The web development system can transfer the code development to the web client completely, so that developers can perform remote development with no need for being exposed to and understanding the development environment, thereby improving the security of the development. It is not necessary for developers, as in the conventional web system, to edit code, to compile the code locally by using the IDE development tool and to deploy the code to the server to run.

Furthermore, according to the web development system according to the present invention, not only in the developing phase development can be performed in the WYSIWYG fashion and in the running state, but also when being used, upgrade of the system can be done with merely modifying the script code and reloading the script code on the server. It is not necessary to shut down the system, recompile, deploy and run the code as in the prior art, thereby improving the upgrade efficiency and user experience. Such upgrade can be partial or complete, making it more flexible.

Additionally, through the web development system and the development method according to the present invention, the code developed by a development team can be uniformly stored in the server, developers can only access their own code, thereby improving the security of producing code.

Moreover, each function module developed for the web development system can be componentized, so that each function module can be readily called by other function modules, and the code of each module can be highly reused.

Although the solutions according to the present invention are described according to the embodiments hereinabove, the solutions according to the present invention are not limited to the specific embodiments. The modifications, variations, accretions and replacements made by a person skilled in the art within the scope according to the present invention also should fall into the protect scope according to the present invention.

The invention claimed is:

1. A development method for a web application system, comprising:
    in a running state of the web application system, performing the following steps at a server of the web application system:
    providing a developer interface to a remote client developer device for the web application system;
    generating or modifying a script code used to perform a predetermined function;
    parsing, by a script parser, the generated script code or the modified script code to correspondingly generate an object type which performs a new function, or to modify an object type which performs an existing function;
    generating a new function object or modifying an existing function object, by an object manager, according to the generated object type which performs the new function or the modified object type which performs the existing function;
    assigning a unique identifier to each generated or modified object type;
    organizing, by the object manager invoking relationships between the new function object and other objects, or invoking relationships between the modified function object and other objects by setting the invoking relationships using the assigned unique identifiers; and
    allowing the web application system to perform the predetermined function based on the generated new function object or the modified existing function object while remaining in the running state.

2. The development method for the web application system according to claim 1, wherein the step of generating or modifying the script code used to perform a predetermined function comprises:

invoking a template corresponding to the predetermined function in a function template library with a set of input parameters, wherein the function template library comprises at least one script template corresponding to the predetermined function; and generating the script code corresponding to the predetermined function.

3. The development method for the web application system according to claim 1, wherein the step of generating or modifying the script code used to perform a predetermined function comprises:

identifying an existing script code corresponding to the existing function and modifying the identified existing script code for the predetermined function.

4. The development method for the web application system according to claim 1, wherein the step of generating or modifying the script code used to perform a predetermined function comprises:

receiving a presentation effect of the function in a visual manner, wherein the script code is modified or generated corresponding to the received presentation effect of the function.

5. A development system for a web application, comprising:

a computing device having a hardware processor configured to operate the web application as a server and to provide a developer interface to a remote client developer device for the web application, the hardware processor further configured to execute:

a set of instructions for script generation and modification, adapted to, in a running state of the web application, generate or modify a script code used to perform a predetermined function;

a script parser, adapted to parse the generated script code or the modified script code to correspondingly generate an object type which performs a new function, or to modify an object type which performs an existing function; and an object manager, adapted to (i) generate a new function object or to modify an existing function object according to the generated object type which performs the new function or the modified object type which performs the existing function, (ii) assign a unique identifier to each generated or modified object type, and (iii) organize invoking relationships between the new function object and other objects, or invoking relationships between the modified function object and other objects by setting the invoking relationships using the assigned unique identifiers, wherein the web application performs the predetermined function based on the generated new function object or the modified existing function object while remaining in the running state.

6. The development system according to claim 5, wherein the set of instructions for script generation and modification comprises:

a code generator, adapted to invoke a template corresponding to the predetermined function in a function template library with a set of input parameters, and generate the script code corresponding to the predetermined function based on the invoked template.

7. The development system according to claim 6, wherein the object manager generates the relationships among the objects by using the code generated by the code generator.

8. The development system according to claim 5, wherein the set of instructions for script generation and modification comprises:

a code editor, adapted to identify an existing script code corresponding to the existing function and to modify the identified existing script code for the predetermined function.

9. The development system according to claim 8, wherein the object manager generates the relationships among the objects by using the code modified by the code editor.

10. The development system according to claim 5, wherein the set of instructions for script generation and modification comprises:

a page designer, adapted to receive a presentation effect of a function in a visual manner, so as to modify or generate the script code corresponding to the presentation effect of the function.

11. The development system according to claim 10, wherein the object manager generates the relationships among the objects by using the code generated or modified by the page designer.

12. The development system according to claim 5, wherein the object manager communicates with the set of instructions for script generation and modification so as to generate the relationships among objects by using the code generated or modified by the set of instructions for script generation and modification.

13. The development system according to claim 5, wherein the computing device further operates a rendering engine of a system user interface (UI) which comprises a set of UI component library and functions for rendering UI interfaces.

14. The development system according to claim 5, wherein the script code conforms to a script syntax standard that can be parsed to generate function objects types.

15. A computing device having a hardware processor configured to perform acts comprising:

providing a developer interface to a remote client developer device for developing a web application system;

during a running state of the web application system, generating or modifying a script code used to perform a predetermined function;

parsing, by a script parser, the generated script code or the modified script code to correspondingly generate an object type which performs a new function, or to modify an object type which performs an existing function;

generating a new function object or modifying an existing function object, by an object manager according to the generated object type which performs the new function or the modified object type which performs the existing function;

assigning a unique identifier to each generated or modified object type;

organizing, by the object manager, invoking relationships between the new function object and other objects, or invoking relationships between the modified function object and other objects by setting the invoking relationships using the assigned unique identifiers; and allowing the web application system to perform the predetermined function based on the generated new function object or the modified existing function object while remaining in the running state.

16. The computing device of claim 15, wherein generating or modifying script code used to perform a predetermined function comprises:

invoking a template corresponding to the predetermined function in a function template library with a set of input parameters, wherein the function template library comprises at least one script template corresponding to the predetermined function; and generating the script code corresponding to the predetermined function.

17. The computing device of claim 16, wherein the script code is generated by a code generator corresponding to the predetermined function based on the invoked template, wherein the generated relationships among the objects are based on the script code generated by the code generator.

18. The computing device of claim 15, wherein the script code is modified or generated by a page designer that is adapted to design a presentation effect of a function in a visual manner, so as to modify or generate the script code corresponding to the presentation effect of the function, wherein the generated relationships among the objects are based on the script code generated or modified by the page designer.

19. The computing device of claim 15, wherein the script code is modified by a code editor that is adapted to invoke the script code to be modified corresponding to the existing function for modification, wherein the generated relationships among the objects are based on the script code modified by the code editor.

* * * * *